(12) United States Patent
Kukulski

(10) Patent No.: US 8,355,007 B2
(45) Date of Patent: Jan. 15, 2013

(54) METHODS FOR USE WITH MULTI-TOUCH DISPLAYS FOR DETERMINING WHEN A TOUCH IS PROCESSED AS A MOUSE EVENT

(75) Inventor: Timothy W. Kukulski, Oakland, CA (US)

(73) Assignee: Adobe Systems Incorporated, San Jose, CA (US)

( * ) Notice: Subject to any disclaimer, the term of this patent is extended or adjusted under 35 U.S.C. 154(b) by 513 days.

(21) Appl. No.: 12/463,837

(22) Filed: May 11, 2009

(65) Prior Publication Data
US 2010/0283747 A1 Nov. 11, 2010

(51) Int. Cl.
*G06F 3/041* (2006.01)

(52) U.S. Cl. .......... 345/173; 715/863

(58) Field of Classification Search .......... 345/173–179; 178/18.01–20.04
See application file for complete search history.

(56) References Cited

U.S. PATENT DOCUMENTS

| | | | | |
|---|---|---|---|---|
| 5,148,155 | A * | 9/1992 | Martin et al. | 345/173 |
| 5,252,951 | A * | 10/1993 | Tannenbaum et al. | 345/156 |
| 6,154,210 | A * | 11/2000 | Anderson | 715/840 |
| 6,850,220 | B2 * | 2/2005 | Sakaguchi | 345/157 |
| 6,938,221 | B2 * | 8/2005 | Nguyen | 715/863 |
| 6,958,749 | B1 * | 10/2005 | Matsushita et al. | 345/175 |
| 7,088,344 | B2 * | 8/2006 | Maezawa et al. | 345/173 |
| 2002/0067347 | A1 * | 6/2002 | Maezawa et al. | 345/173 |
| 2006/0267957 | A1 * | 11/2006 | Kolmykov-Zotov et al. | 345/173 |
| 2006/0282574 | A1 * | 12/2006 | Zotov et al. | 710/62 |
| 2007/0109275 | A1 * | 5/2007 | Chuang | 345/173 |
| 2007/0257891 | A1 | 11/2007 | Esenther et al. | |
| 2008/0036743 | A1 * | 2/2008 | Westerman et al. | 345/173 |
| 2008/0158170 | A1 * | 7/2008 | Herz et al. | 345/173 |
| 2008/0180402 | A1 * | 7/2008 | Yoo et al. | 345/173 |
| 2008/0297482 | A1 | 12/2008 | Weiss | |
| 2009/0006292 | A1 | 1/2009 | Block | |
| 2009/0066659 | A1 | 3/2009 | He et al. | |
| 2009/0094515 | A1 | 4/2009 | Do et al. | |
| 2009/0109191 | A1 * | 4/2009 | Felder et al. | 345/174 |
| 2009/0225039 | A1 * | 9/2009 | Williamson et al. | 345/173 |
| 2009/0295746 | A1 * | 12/2009 | Davidson | 345/173 |
| 2010/0053111 | A1 * | 3/2010 | Karlsson | 345/174 |

* cited by examiner

*Primary Examiner* — Alexander Eisen
*Assistant Examiner* — Sanjiv D Patel
(74) *Attorney, Agent, or Firm* — Schwegman Lundberg Woessner P.A.

(57) ABSTRACT

A multi-touch driver handling user inputs or touches on a multi-touch input device. The method includes receiving touch data associated with a touch detected by the multi-touch input device. The multi-touch driver determines a target user interface (UI) component for the touch by processing the touch data and then determines whether the target handles touch events. If so, the driver sends the touch data to the target for handling as a touch event, thereby saving a touch-to-mouse conversion for later touches. The touch may be a first touch received in a particular input region of a GUI displayed on a touch surface. The driver receives touch data for a second touch input later than the first touch but while the first touch is still active. The driver determines a target UI component for the second touch and passes the second touch data to the second target as a mouse event.

14 Claims, 6 Drawing Sheets

METHODS FOR USE WITH MULTI-TOUCH DISPLAYS FOR DETERMINING WHEN A TOUCH IS PROCESSED AS A MOUSE EVENT

BACKGROUND

1. Field

The present disclosure relates, in general, to computers and other electronic devices with multi-touch sensitive display surfaces or screens, and, more particularly, to an improved method for determining whether a touch or contact with the multi-touch surface or screen is processed (e.g., treated or handled) as a touch event or as a mouse event.

2. Relevant Background

Multi-touch surface computing is growing rapidly and is spreading quickly from large table computers to handheld electronic devices such as phones and personal music players. Multi-touch refers to a set of interaction techniques that allow computer users to control graphical applications with two or more fingers or pointers. Generally, multi-touch systems include a touch screen or surface and software that recognizes and processes multiple touch points on the surface rather than just a single touch point as may have been the case with typical touchpads.

Multi-touch systems may use a wide variety of technologies to implement to touch screen or touch input device to determine where a touch occurs and to track a continued touch along a surface. For example, the touch surface may use heat, pressure, high capture rate cameras, infrared light, optic capture, tuned electromagnetic induction, laser rangefinders, shadow capture, and other techniques to provide touch or contact input information to the software or drivers (e.g., multi-touch drivers or the like) that determine points of contact and provide the user input to applications.

Multi-touch displays surfaces are used by computer and electronic device designers to creatively present interfaces to one or more users such as graphical objects that may be selected, sized, moved, scrolled, and otherwise manipulated through the use of fingers or other physical contact devices (e.g., a pen, a stylus, or the like). Typically, a computer renders a graphical user interface (GUI) on the multi-touch display surface or screen, and users may manipulated GUI objects or displayed elements directly with their hands using multi-touch technology rather than traditional input devices such as a mouse or a keyboard. In other words, multi-touch devices and systems merge the user input and data output devices into a single surface, which provides an intuitive and efficient mechanism for users to interact with a computer and applications running on the computer (e.g., to manipulate drawings, photographs, data files, and the like).

A number of problems arise from the use of a multi-touch display surface. Often, the multi-touch technology is added onto an existing computing system and its applications may have been adapted for use with prior user input technologies. For example, a computer system or electronic device may have software applications in which all or portions of its GUI are configured to receive and process mouse events and mouse gestures such as to point at or select a displayed object in the GUI. In other cases, an application running on a multi-touch system or device may have one portion or area that receives and processes touch events (i.e., a non-mouse event application or multi-touch application portion) and other portions or areas, such as a menu or control interface, that is responsive to mouse events but not touch events.

By default, current multi-touch systems have software, such as a multi-touch driver, that treats a first touch or contact by the user on the multi-touch surface as a mouse event and second and later touches are treated as touch events until the first touch is release or removed from the surface (e.g., the mouse adapter becomes available). As a result, portions of the GUI and/or portions of applications may not be able to receive user input or to interface with the users. In an exemplary multi-touch system, a first touch within an interactive graphics portion of a GUI may be processed or handled as a mouse event and block a concurrent second touch from being able to interact or use a portion of the GUI corresponding to a non-multi-touch application, which requires a mouse event. This is particularly problematic when multi-touch display technology is implemented in a system with legacy or existing software or applications as these will often include applications that have one or more windows or portions in the GUI that not configured to handle touches or touch events.

SUMMARY

Briefly, a touch handling method is described that may be implemented in a multi-touch driver to selectively handle or treat touch events as mouse events. In many multi-touch systems, a graphical user interface (GUI) is presented upon the touch input surface or device. The GUI may include one or more regions or areas that are associated with multi-touch (MT) aware UI component, and the GUI may also include one or more regions or areas that are associated with non-MT aware UI components (i.e., applications or UI components of applications that expect and handle mouse-based inputs or events, keyboard inputs, and so on). In prior multi-touch systems, a first touch at any location within the GUI, even within the MT aware region, was translated into a mouse event and a mouse adapter (or touch-to-mouse conversion) was associated with the first touch and unavailable to second or later touches. This often resulted in regions of the GUI that were associated with non-MT aware UI components being disabled or unable to accept user input until the mouse adapter was released or available (e.g., the first touch was ended).

In contrast, the touch handling method described herein includes receiving a touch and determining a target application (or UI component) for the touch based on location/geography, on application mode, or the like. The method also includes determining whether the target application handles or accepts touches or touch events, and, if so, the received or sensed touch is handled as a touch event with the mouse conversion or adapter being saved for use by other portions of the GUI or UI components associated with regions or areas of the MT surface or screen. When the target does not accept/handle touches, the method may include determining whether the target accepts mouse events and, if so, whether the mouse adapter or touch-to-mouse conversion is available. When both are found to be true or satisfied, the method may further include marking the adapter or conversion as unavailable, translate the touch to a mouse event, and pass the mouse event to the target for further processing as user input. While the touch is maintained, updates are also sent as mouse events to the target(s). When the touch is ended (e.g., a finger is lifted away from the surface or the like), the mouse adapter or touch-to-mouse conversion may again be made available for use in handling later touches received by the multi-touch surface or input device. In some cases, the method or its associated functionality may be provided on a per-application basis in addition to a per-system basis, e.g., each application may have its own touch-to-mouse adapter.

More particularly, a method is provided for handling or processing user input touches for use with a multi-touch input device such as a computing or electronic device with a multi-touch surface or screen. The method includes running a multitouch driver with a processor, and the multi-touch driver may include a touch event processing module configured to provide many of the functions of the method. The method further may include receiving touch data associated with a user touch or input event detected by the multi-touch input device. The multi-touch driver may be used to determine a target user interface (UI) component for the touch or received touch data by processing this data (e.g., by comparing location or geometry information with regions or areas of the touch surface associated with UI components, by examining application mode data, and so on). The multi-touch driver may further determine whether the target UI component handles touch events, and, if so, sending the touch data to the target user interface for handling as a touch event, which may include translating the touch into a touch event. In some cases, parts or portions of the multi-touch driver may reside on the touch device itself while in other implementations parts or portions may be provided on the host system and/or be part of applications as well.

In the method, the touch may be a first touch received in a particular input region or area of a GUI displayed on the touch surface of the multi-touch input device, whereby the first touch is not by default processed or handled (with these terms used interchangeably in this description) as a mouse event. In such a case, the method may include receiving touch data for a second touch that is received later in time than the first touch but while the first touch is maintained (or not yet ended/released). The method may include determining a target UI component for the second touch and passing the second touch data to the target UI component for handling as a mouse event. In this manner, a second touch may be processed or handled as a mouse event.

In some embodiments of the method, the target UI component may be determined to not handle touch events. The method may then involve determining whether the target UI component handles mouse events, and, if so, sending the touch data to the target UI component for handling as a mouse event (e.g., translating the touch into a mouse event and passing to the appropriate application or UI component of the application). The method may include determining whether a touch-to-mouse conversion module or mouse adapter is available prior to sending the touch data to the target UI component as a mouse event. If available, the method may include marking the conversion module is unavailable to later received touches or to other UI components (until the current touch is ended/released). The touch data may be received after the multi-touch driver has processed or begun processing of an earlier touch associated with another target UI component, which is adapted for handling or accepting touch events. In this manner, a second or later-in-time touch may be processed as a mouse event when one or more prior touches have been received (and maintained or are concurrent/active touches) that are being processed as touch events (e.g., by MT aware UI components). In some cases, the method is used to retrofit system to provide a technique for getting a new behavior even though the underlying system is providing the old style or convention of first-only event conversion.

According to another aspect or embodiment, a computer readable medium is provided for handling touch events on a multi-touch surface. For example, the computer readable medium may include computer useable and/or readable code stored in a computer memory or in storage medium readable by a processor of a computer (e.g., a multi-touch driver program run by a CPU, a routine used or called by a multi-touch driver when run by a computing or electronic device receiving contact or touch data from a MT surface or device, or the like). The computer readable medium may include computer readable program code devices configured to cause a computer to receive first touch data associated with a first touch provided at a first time in a first input region of a graphical user interface displayed on a multi-touch surface. The computer readable medium may also include computer readable program code devices configured to cause the computer to receive second touch data associated with a second touch provided at a second time later than the first time in a second input region of the graphical user interface. Further, the computer readable medium may include computer readable program code devices configured to cause the computer to handle the first touch data as a touch event and the second touch data as a mouse event, whereby the first touch may be maintained or active at the second time (e.g., the second touch is received while the first touch is still being updated or processed by the first UI component).

In some embodiments, the first input region corresponds to a first user input component adapted for accepting touch events and the second input region corresponds to a second user input component adapted for accepting mouse events and not accepting touch events. The computer readable medium may also include computer readable program code devices configured to cause the computer to determine the first user input component is a target of the first touch and to determine the second user input component is a target of the second touch. In some cases, the computer readable medium includes computer readable program code devices configured to cause the computer to determine whether the first user input component accepts touch events prior to handling the first touch data as a touch event. Yet further, the computer readable medium may include computer readable program code devices configured to cause the computer to determine whether the second user input component accepts touch events and, when touch event are not accepted, performing the handling of the second touch data as a mouse event. Optionally, the computer readable medium may include computer readable program code devices configured to cause the computer, prior to handling the second touch as a mouse event, to determine that a touch-to-mouse conversion module is available for use by the second user input component. Note, also, that the methods described herein and the medium/software providing the functions described herein may be provided as middleware, as part of an interpretation environment, and/or as part of a virtual machine.

DETAILED DESCRIPTION

The following description describes use of software (and/or hardware) implementations of user input handler or processor for use with a multi-touch system or device to more effectively handle a first user input on a multi-touch surface or screen. For example, prior multi-touch system's typically used a multi-touch driver that would treat the first user touch as a mouse event in all cases, which caused a touch-to-mouse event converter or adapter to be unavailable for later touches until the first touch was ended. The user input handler or mouse touch processing module described herein may, for example, be implemented in a multi-touch driver of a computer or electronic device that is running an application that has first and second user interface regions or windows on a multi-touch surface or user input device. The multi-touch driver functions to receive user input (e.g., a user's first touch, point (e.g., proximal but not always requiring contact), or contact (e.g., contact with an input device with a stylus, pen, or the like) of a multi-touch screen—all of which may be considered "touches" in this description), and the multi-touch driver maps the coordinates or location of the user input or touch to surface areas or regions corresponding to the first and second applications.

The first application may accept only mouse touch events while the second application may accept multi-touch events or touch events (or simply a touch). If the received user input is mapped to the first application interface region, the multi-touch driver sends the input on to the first application as a mouse event (and marks touch-to-mouse conversion as unavailable). If the received user input is mapped to the second application interface region, the multi-touch driver sends the input on to the second application as a touch event (not as a mouse event), which reserves the touch-to-mouse conversion or adapter for use by a next user input or touch. In this manner, the first application may receive user input processed as mouse events even if it is not the first to receive a user input or touch, whereas in prior multi-touch systems the first application would have had wait idle until a first touch (or the touch-to-mouse conversion) again became available. In this manner, concurrent or simultaneous interfacing with more applications or components of an application is supported by the touch processing methods and techniques (and multi-touch and computer systems/devices incorporating such methods) described in herein with reference to FIGS. 1-6.

Figure 1:
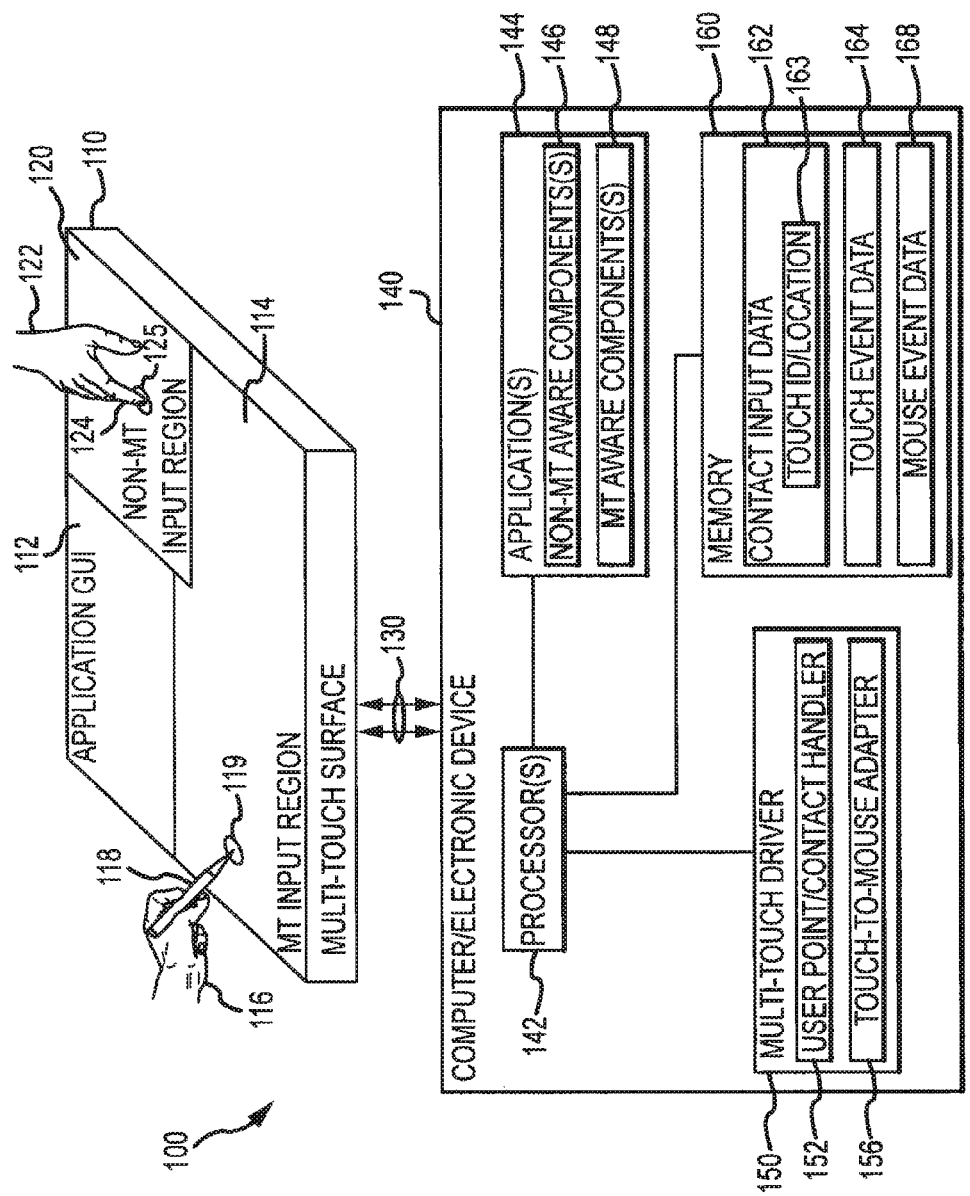
FIG. 1 illustrates in functional block form a computer or computer system including a multi-touch (MT) surface, screen, or input device and showing use of a multi-touch driver that is configured to handle user inputs (e.g., contacts or touches) as mouse or touch events in a selective manner.

FIG. 1 illustrates a computer or computer system (or electronic device system) 100 with a multi-touch surface or input device 110 that is coupled to a computer/electronic device 140 via power and/or communication links 130. The multi-touch surface 110 is configured with a multi-touch (MT) input region 114 in which an application(s) graphical user interface (GUI) 112 may be displayed via data transferred to and from the computer device 140. For example, computer device 140 may include a processor or CPU 142 that runs one or more applications 144 that generate a GUI 112 that displays data, graphics, images, and the like on the MT input region 110 of the multi-touch surface or device 110. The application 144 may include one or more components 146 that are legacy or other components that are not adapted for receiving touch events but instead expect and process mouse events (e.g., non-MT aware components), and the application 144 may also include one or more MT aware components 148 that are able to and adapted for receiving and processing touches or touch events provided via the multi-touch surface 110.

As shown, during use of the system 100, the application GUI 112 includes a multi-touch (MT) input region 114 corresponding to the MT aware component(s) 148 of application 144 and a non-MT input region 120 corresponding to the non-MT aware component(s) 146. A user may use their hand 116 or an input implement 118 to provide user input (e.g., a touch) at location or point 119 in the MT input region 114. The multi-touch surface 110 may act to sense this input and transfer touch or contact information via link 130 to the computer device 140. The processor 142 may manage operation of memory 160 and act to store the received contact/input data 162. A multi-touch driver 150 may be provided on the computer/electronic device 140 and be adapted to separate the input data 162 into touch event data 164 and mouse event data 168 (both of which may at least temporarily be stored in memory 160 of the computer 140). The touch event data 164 and mouse event data 168 may include location information and/or identification information 163 (e.g., a touch location and ID to uniquely identify the touch or input from the user on the MT surface 110).

A user point/contact handler 152 (e.g., a software routine or module run or executed by processor 142) may be provided in the multi-touch driver 150 to process the user input (e.g., a touch or pointing at location 119) to determine whether the input or touch is associated with the MT aware component 148. If so determined, such as by mapping of the location or coordinates of the location 119 to the MT input region 114 of GUI 112, the input or touch is passed to the MT aware component 148 as a touch event (e.g., as a touch event only) and the touch-to-mouse adapter or conversion module 156 is maintained as available for other applications/components to use. The same or a different user may use a hand 122 to provide additional user input or another touch, such as with their finger 124, at a second contact point or location 125. This location or point 125 is in an input region 120 of the GUI 112 (or different area of the multi-touch surface 110) that is associated with the non-MT aware components 146 of the application 144.

In this case, contact input data 162 is received by the computer 140 (over the link 130 from the MT surface or device 110) and processed by the user point/contact handler 152 of the MT driver 150. The location or point 125 has coordinates that map to the non-MT input region 120 and non-MT aware component 146, and, hence, the handler 152 causes the driver 150 to classify the input data 162 as mouse event data 168 (e.g., a touch location and ID). The touch is passed to the non-MT aware component 146 as a mouse event by the processor 142 and the touch-to-mouse adapter or conversion module 156 is associated with the component 146 and marked as unavailable for use by other applications. Additional inputs or touches may be received while the input at location 125 or in region 120 is maintained if the inputs are provided in the MT input region 114 (e.g., additional touch events may be processed concurrently with the contact at point 125). If an additional input is provided in region 120, however, the touch would not be forwarded to the non-MT aware components until after the contact or touch initiated at location 125 is removed or released. In the system 100, the location information for the contact points 119, 125 and other data such as time received may be determined by the multi-touch surface or input device 110 and its hardware/software and/or it may be provided as raw data over link 130 to processor 142 for processing by MT driver 150 or other components (not shown) to produce the information used by the user point/contact handler 152 in determining whether to treat the input as a touch event or as a mouse event (as described herein such as with reference to FIGS. 3-6).

The system 100 (and system 200 of FIG. 2) may utilize a wide variety of technologies for the multi-touch surface 110. Multi-touch (MT) is intended to denote nearly any technology and implementing device that allows interaction between a user and running software/applications using two or more input devices to "touch" a graphical user interface (GUI). For example, the MT device may include a touch screen or touchpad as well as software that recognizes multiple simultaneous touch points. The ability to receive or sense these inputs may be achieved by use of sensors or detection devices based on heat, pressure, cameras, infrared light, optic capture, tuned electromagnetic induction, ultrasonic receivers, transducer microphones, laser rangefinders, shadow capture, or another technology for detecting receipt of a touch and its location on a MT surface or screen. A "touch" in this description refers, therefore, to a user input event that is detected or sensed by a MT technology and transmitted with location information to a computer (such as computer 140) for use as input to an application via its interface (displayed on the MT surface). For example, a touch may also be sensed or detected by mechanical actuators, strain gauges, and the like.

Likewise, the computer or electronic device 140 (and 230 in FIG. 2) may take numerous forms to practice the invention. Generally, the devices 140, 230 may be any electronic device with a processor running one or more applications presenting user interfaces via a MT surface or screen and software for processing the touches such as one or more multi-touch drivers adapted to perform as described herein. For example, the devices 140, 230 may be a surface computer, a desktop or workstation computer, a laptop, notebook, handheld, mini, or other portable computer, a wireless communication device such as a cellular phone, personal digital assistant (PDA), or the like, a video game system (portable or home unit), and so on.

Embodiments described herein of systems 100, 200 and the like (e.g., computer architectures running multi-touch drivers functioning according to one or more embodiments of the invention) may include or utilize a special purpose or general-purpose computer including computer hardware. Embodiments may include physical and other computer-readable media for carrying or storing computer-executable instructions and/or data structures (such as the applications, drivers, and data stored in memory shown in systems 100, 200 and the like). The computer-readable media may be any available media that can be accessed by a general purpose or special purpose computer system. For example, computer-readable media may include media that stores computer-executable instructions or physical storage media. Physical storage media may include RAM, ROM, EEPROM, CD-ROM or other optical disk storage, magnetic disk storage or other magnetic storage devices, or any other medium which may be used to store desired program code in the form of computer-executable instructions or data structures and which can be accessed by a general purpose or special purpose computer.

The computer or electronic devices typically are linked or coupled closely to the MT surface (and its hardware/software), but, in some embodiments, the MT surface may be linked to the computer by a digital communication network or the applications, memory, drivers, or the like may be accessed by the computer or electronic device over a network. A "network" may include one or more data links that enable the transport of electronic data between computer systems and/or modules and/or other electronic devices. The network and/or data links may also be used to carry program code in the form of computer-executable instructions or data structures, which may be accessed by a general purpose or special purpose computer. Combinations of the above should also be included within the scope of computer-readable media. Computer-executable instructions may include, for example, instructions and data which cause a general purpose computer, special purpose computer, or special purpose processing device to perform a certain function or group of functions. The computer executable instructions may be, for example, binaries, intermediate format instructions such as assembly language, or even source code.

Figure 2:
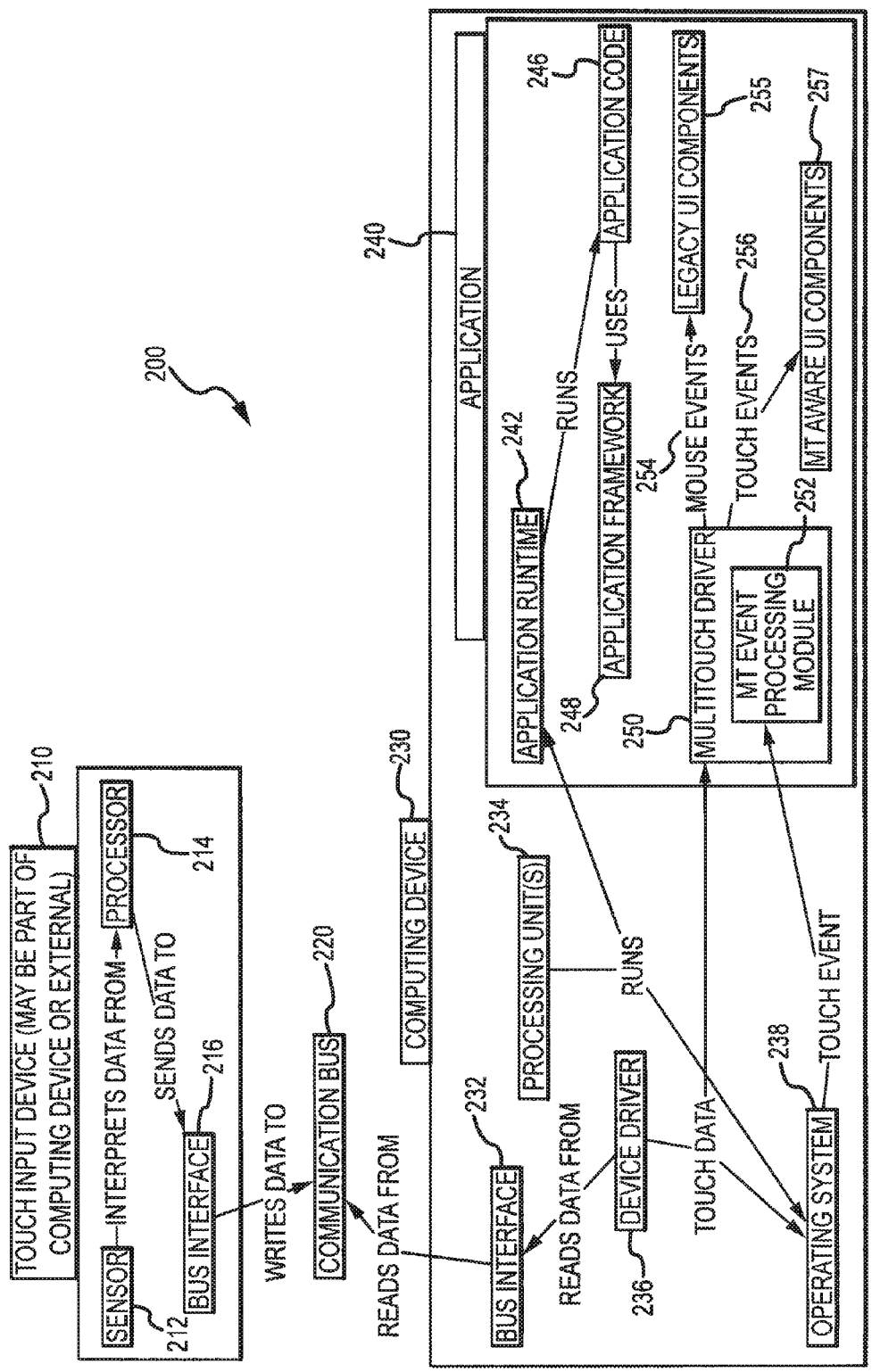
FIG. 2 illustrates in functional block form another multi-touch system or device illustrating state and/or data that may be processed to process detected/received touch events (also termed point or contact events and touches (which may also include proximity inputs depending upon the multi-touch technology used to detect or sense "touches" or inputs from a user) as either mouse or touch events that are provided as inputs to UI components or portions of one or more running applications.

FIG. 2 illustrates a computer system or electronic device 200 illustrating in a functional block manner a multi-touch technique for more effectively handling touches or user inputs to utilize non-MT aware (or legacy) interfaces. Specifically, system 200 is adapted with a multitouch driver 250 that functions with the use, in this example, of a MT event processing module 252 to process touches or user inputs on a MT surface or input device to classify the touches as touch events or mouse events and then to pass the classified user input events to the corresponding application or UI components of an application(s). In this manner, the first user input or touch is not by default assumed to be a mouse event but each touch is instead processed to determine if the touch can be handled or processed by a MT aware component prior to attempting to handle or process the input as a mouse event. This allows mouse events to be generated on second, third, or later of a set of concurrent touches on a MT surface.

As shown, the computer system 200 includes a touch input device 210, which may be part of computing device 230 (e.g., mounted on or as integral part of a computer housing such as in a MT computer surface/table or the like) or external to the computing device 230 (e.g., spaced apart and communicatively coupled to the device 230). The touch input device 210 includes one or more sensors 212 that operated to sense touches to the input device 210, and a processor 214 may be included to interpret the data from the sensor(s) 212 such to determine whether a touch has occurred, whether a touch has been maintained or released, a location or point of contact for a touch relative to a surface/screen of the input device 210, whether a touch location has been moved on the screen, and the like. The processor 214 sends this contact or touch input data to a bus interface 216, which writes the data to communication bus 220 that links or couples the touch input device 210 to the computing device 230. The communicated data often will include a touch ID as well as location data (such as X-Y coordinates on the screen or surface) for each detected or sensed touch or user input.

The computing device 230 uses a bus interface 232 to read data from the communications bus 220 including the contact or touch input data from the processor 214. The computing device 230 includes one or more processors or CPUs 234 that run one or more applications 240 as shown with a runtime 242 running code 246 (which, in turn uses an application framework 248). The application 240 is shown to include legacy UI components 255, which are not configured for touch events but instead expect and process mouse events 254 (or keyboard events/input (not shown)), and the application 240 also include MT aware UI components 257 that expect and handle touch events 256. The events 254, 256 are provided as user input via GUI generated by the application 240 during runtime 242 and displayed on the touch input device 210 to a user of the system 200.

The processing unit 234 also runs an operating system (OS) 238 and a device driver acts to read user input or touch data from the bus interface 232, which it passes to the OS 238. The OS 238 processes the touch data and provides the data or user input/contact event data to a multitouch driver 250 (shown here to be run by the processing unit 234 as part of the application 240 runtime 242). The multitouch driver 250 includes an MT event processing module 252 that is configured to process the touch data and/or user input/contact event data to determine whether to handle these inputs/touches as mouse events 254 or as touch events 256 (and to determine which UI component 255, 257 to provide the events to). In practice, this may be accomplished by employing the method 300 shown in FIG. 3. Briefly, though, the MT event processing module 252 may determine whether the touch or input corresponds to a MT aware UI component 257 or to a non-MT or legacy UI component 255. If to a MT aware UI component 257, then the touch or input is characterized or classified as a touch event and passed as a touch event 256 to the appropriate one of the MT aware UI components 257. If to a non-MT aware or legacy UI component 255, then the driver 250 characterized or classifies the touch or input as a mouse event 254 and passes it as such to a corresponding one of the legacy UI components 255 (e.g., the component with an input region on the GUI displayed on the input device 210 that includes the coordinates or location of the touch) for further processing. Often, a system 200 may only support one mouse event at a time, and, in such cases, a touch-to-mouse conversion may be marked as not available upon or prior to generation of the mouse event 254 to the non-MT aware UI component 255, and the touch-to-mouse conversion module or adapter may be released or marked as available upon release of user input (e.g., upon receipt of touch data indicating a user has ended a touch associated with the mouse event).

Figure 3:
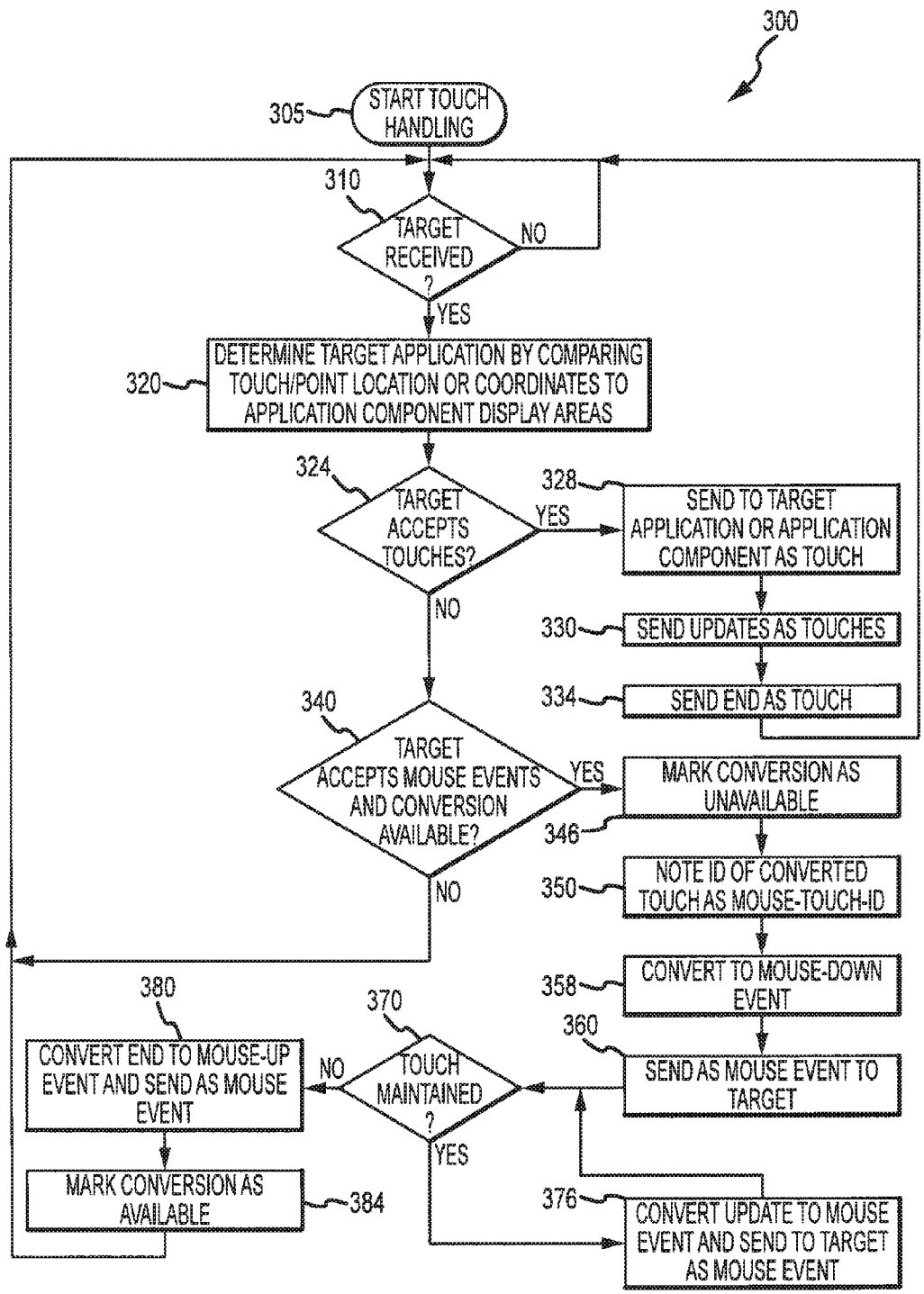
FIG. 3 is a flow chart of a touch (or contact, point, or the like) handling process for use with a multi-touch surface, screen, or display device and as may be implemented, for example, by operation of the system of FIG. 1 or the system of FIG. 2.

FIG. 3 illustrates a touch handling process 300 as may be implemented by the MT drivers 150, 250 of FIGS. 1 and 2. The process 300 starts at 305 such as by a multi-touch surface or touch input device displaying a GUI with regions or windows associated with two or more applications or components of one or more applications, and these applications or components may have user interfaces that are MT aware or that are not adapted for receiving/processing touches (i.e., a non-MT aware interfaces or application components). At 310, the multi-touch surface or input device may receive a touch or user input (with a finger, hand, or other input device), and touch or contact data such as a touch ID and location may be passed to a computing device for processing by its multi-touch driver or other mechanism.

When it is determined at 310 that a touch or input has been received, the method 300 continues at 320 with determining with the multi-touch driver a target application, and if a touch is not received the method 300 continues at 310. As part of step 320, the driver 150 may access the contact or touch data to obtain a touch location (e.g., X-Y coordinates, by other geometry processes, or the like) and compare this with a set of application component display areas, which may define areas or regions of the MT surface or screen associated with the user interface of each application or application component presently accessible via a displayed GUI. In some cases, though, the touch or contact data may include a target application due to prior processing by the MT device and/or computing device components. Once a target application for a touch is determined or identified at 320, the method 300 may continue at 324 with the MT driver determining whether the target accepts touches or is a MT aware UI component.

If the touch corresponds to a MT aware target, the MT driver acts at 328 to send the touch (or touch data) to the target application or target UI component as a touch event. When updates are detected for this particular touch, the updates are also sent as touches or touch events to a target or corresponding UI component. For example, a user may touch a MT screen at a first location and drag their finger to a second location, and the location update information would be sent as a touch event (associated with the same touch event such as by touch ID) to the MT aware UI component for further processing. At 334, a detected end or release of a touch is also sent as a touch or touch event to the MT aware UI component, and the method 300 continues at 310 with waiting for a next or an additional touch or contact from a user on the MT surface or screen.

At 324, when the MT driver determines that the target application or target UI component does not accept touches (or is non-MT aware as may be the case for a legacy UI component), the driver acts at 340 to determine whether the target accepts mouse events and whether the touch-to-mouse adapter or conversion module is available. If not, which may be the case if a touch has previously been converted to a mouse event, the method 300 continues at 310 with waiting for a next or additional user input or touch on the MT screen or surface. If mouse aware and conversion available, the method 300 continues at 346 with MT driver marking touch-to-mouse conversion as unavailable. At 350, the touch or user input is processed such that its record in memory (e.g., the event data 162, 164, 168 shown in FIG. 1) is updated to note that touch associated with the current ID has been converted into a mouse event (e.g., the ID of the converted touch may be changed to a mouse-touch ID or the like). At 360, the touch is sent as a mouse event (with location information) to the target application or target UI component for further processing/use. Method 300 may also include at 358 converting the touch into a mouse-down event that is sent to the target application.

At 370, the method 300 may include determining whether the mouse-event touch has been maintained, and when it has, the method 300 may include converting updates to mouse events that are then sent to the target application or UI component. For example, a mouse-down event may act to select a graphical object in a legacy portion or region of GUI, and a user may act to manipulate the selected object with mouse updates, e.g., to drag the selected object to a new location, to rotate/position the object, to size the object, and other mouse-based gestures or interactions. When the touch is not maintained on the MT surface, the end of touch is converted to a mouse-up event at 380 by the MT driver and sent to the target application or UI component as a mouse event. At 384, the method 300 continues with marking the conversion or touch-to-mouse adapter as available, and the method 300 may again wait for additional touches at 310.

Note, the method 300 is intended to handle more than one simultaneous or at least concurrently applied touches, and the steps shown for the method 300 may be performed for two or more touches at the same time. For example, two touches may be received simultaneously and both be processed as shown in FIG. 3 to determine whether to handle one or neither of the touches as a mouse event. In another case, a first touch may be received at a first time at a first location in a region associated with a first UI component and process 300 may be initiated for this touch, and a second touch may be received at a second time (later than the first time) at a second location in the region associated with the first UI component or a different region associated with a second UI component. This second touch would be processed concurrently with the first touch (but the steps of method 300 may be offset in time, for example). Additionally, third, fourth, fifth, and more touches may be received concurrently and sequentially on a MT surface and processed by the method 300 implemented by one or more MT drivers as described herein. In this manner, each touch is processed to determine whether it was received in a non-MT aware region that handles mouse events and, if so, whether the touch-to-mouse conversion is available for use by this touch. A touch occurring in a MT aware region of a GUI or MT surface will not cause the conversion to be marked as unavailable, which allows a GUI with non-MT aware components to be more effectively used in a MT-based system or device.

Figure 4:
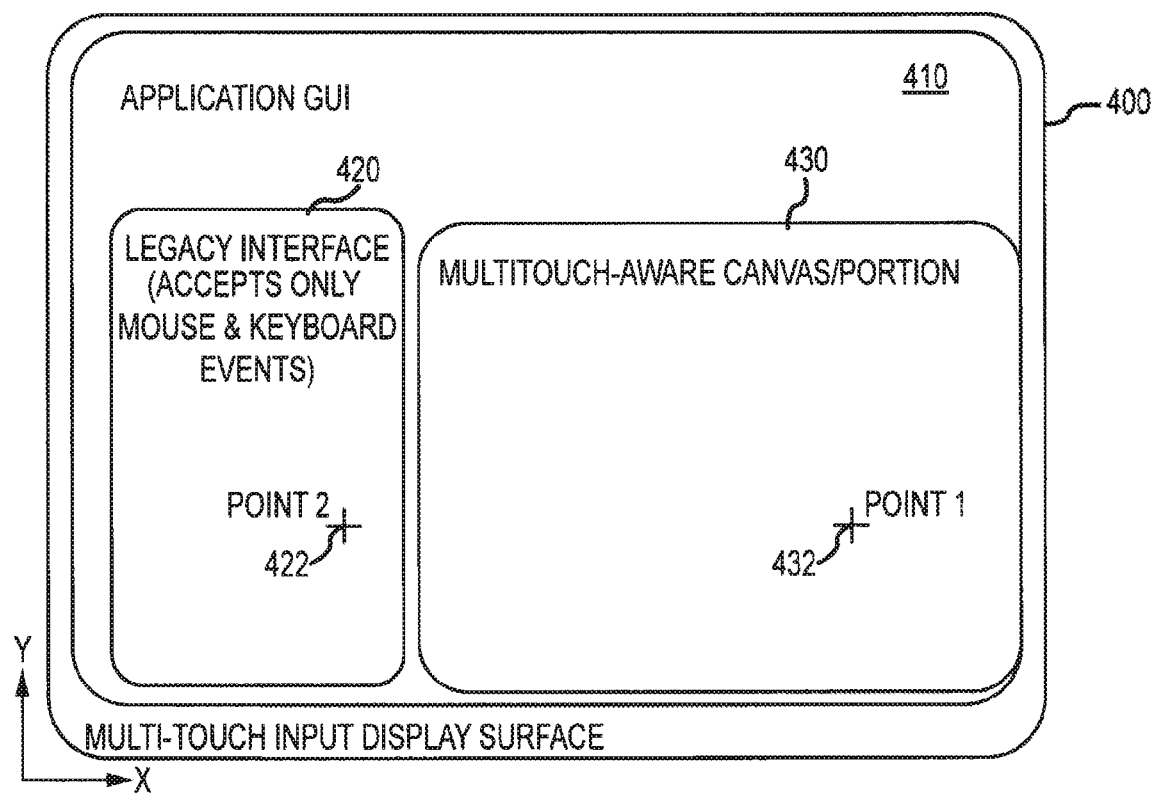
FIG. 4 illustrates a multi-touch input display surface during use to display an application GUI with two interface or input regions or areas (e.g., one that corresponds to a multi-touch (MT) aware component or portion of the application and one that corresponds to a non-MT aware component or portion of the application, such as a legacy interface or the like)

FIG. 4 illustrates an exemplary multi-touch input display surface 400 such as may be provided in a MT device or system as shown in FIGS. 1 and 2 and that may be used during implementation of method 300 of FIG. 3. As shown, an application GUI 410 is displayed within or via the display surface 400. The application GUI 410 may be generated when a computing device associated with the display surface 400 runs one or more applications by a processor. The application (s) associated with the GUI 410 may be an application that includes components that are adapted specifically for use with touch devices or display surfaces (such as surface 400), and these components may generate user interface regions or windows 430 that may be considered multitouch-aware portions, regions, or canvas 430. In contrast, though, the application associated with the application GUI 410 may also include one or more UI components that are not adapted for touch inputs but instead expect more conventional inputs such as keyboard inputs or mouse events. Such UI components may generate a legacy interface 420 that accepts mouse events (and keyboard events), which may also be called a non-MT aware interface portion or region of the GUI 410.

In a typical implementation, the MT aware portion 430 may be associated with interface graphics portion of the application such as may be used to display photographic images, models, animated video images, and so on that may a user may select, move, size, or otherwise manipulate with one, two, or more fingers (or other input devices). The non-MT aware interface portion 420 may, in contrast, be a controller or control portion (such as a menu) that may include buttons, labels, menus, popup menus, scrollbars, sliders, and other input objects more typically operated based on mouse gestures. Such a legacy interface 420 may be built from parts owned by parties other than those that developed the MT aware portion 430 (e.g., UI widgets and the like), may be written or created prior to multitouch technologies were available (but this is, of course, not necessary to practice the invention), and may be expensive or even nearly impossible/impractical to upgrade to be multitouch aware.

In use with a multi-touch driver (and/or a user touch/contact handler) as described herein, the application GUI 410 is displayed on the MT input display surface 400. A first contact on a first point or location 432 in the MT aware portion 430 will be processed and handled as a touch event because the driver determines that the UI component or portion of the application associated with the GUI 410 can handle touches or touch events. In such a case, the touch-to-mouse conversion is still available such that a second contact, point, or touch by a user at a second point or location 422 in the legacy interface 420 results in the touch being handled or processed as a mouse event. This also would occur if the touch at location or point 422 were the first-in-time touch received in the GUI 410. Likewise, if two, three, or more touches occur in portion 430 prior to a touch in interface portion 420, the touch at location or point 422 will still be processed as a mouse event as the touch-to-mouse conversion remains available as touches to the MT aware portion 430 do not cause the conversion to become unavailable (as is the case of a touch in interface or non-MT aware portion or region 420). Hence, interface 420 may be interacted with by a user even when it is not touched or contacted first by a user, with a first touch in this region (or another non-MT aware region) of the GUI 410 causing the touch-to-mouse conversion module or adapter to be marked as unavailable.

Figure 5:
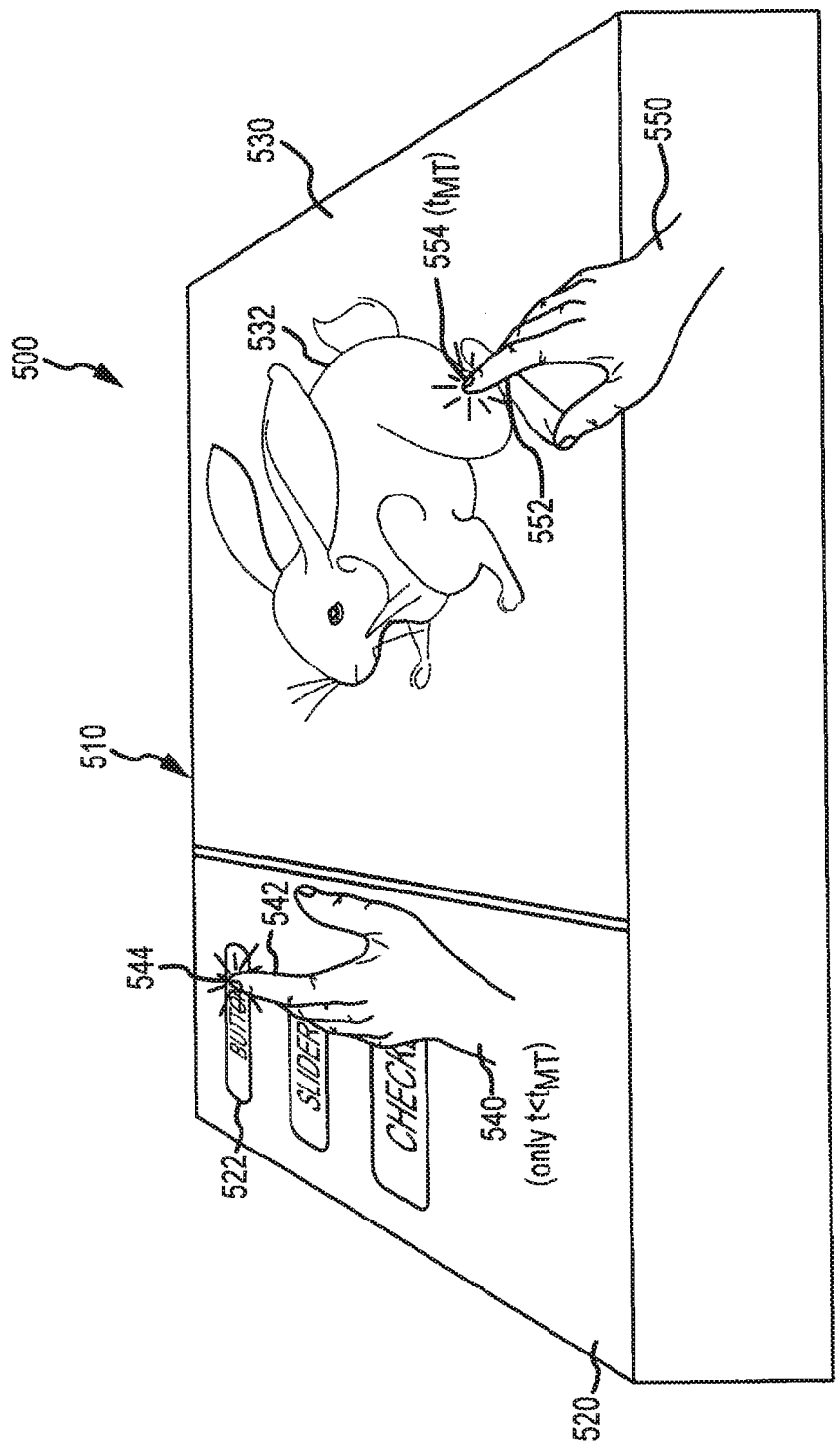
FIG. 5 illustrates a conventional or prior art multi-touch device in which touches to a non-MT aware area or input region are only allowed or processed when they occur prior to touches to a MT aware area or input region (or when no other touches are occurring)

FIG. 5 illustrates a conventional multi-touch system or device 500 with a multi-touch surface 510 for receiving user inputs as one, two, or more touches that are sensed by an MT technology to provide contact data (e.g., location of a touch on the surface 510). As shown, the surface 510 may include or provide a legacy UI region or portion 520 that displays selectable objects and the like 522, and this portion 520 is provided by a non-MT aware UI component of one or more applications run by the system 500. The surface 510 also displays or provides a touch aware portion 530 of the GUI that displays interactive graphics, objects, and so on 532, and this portion 530 corresponds to (or is generated by) a MT aware UI component of one or more applications run by the system 500.

In this conventional multi-touch system 500, a first touch is by default processed as a mouse event regardless of where on the surface 510 it occurs. Hence, when a user 550 uses a finger 552 (or other input device) to touch the MT aware portion 530 of the GUI at point or location 554 at a first time, $t_{MT}$, the system 500 determines that this is a first-in-time touch and translates the touch event into a mouse event. The touch-to-mouse conversion is, hence, unavailable while the contact with finger 552 is maintained, e.g., if the user 550 continues to manipulate the object 532 by dragging it or the like, additional mouse events cannot occur in the system 500. If a user 540 uses their finger 542 (or other input device) to contact or touch an object 522 or other point or location 544 in non-MT aware region 520, the touch can only be processed and translated by the system 500 into a mouse event when it occurs at a time, t, prior to time, $t_{MT}$, of the touch in the MT-aware region 530 (or after the touch in the region 530 has been ended/released). The handling of touch events such that a first (and only first) touch event is translated into a mouse event allows compatibility of touch UI components with legacy or non-MT aware UI components, but it produces the undesirable result that the legacy or non-MT aware UI components often may be unavailable or non-interactive (even though they are being displayed in the surface 510) as the MT-aware UI portion or region 530 has received the first touch and is blocking other touches as being processed as mouse events.

Figure 6:
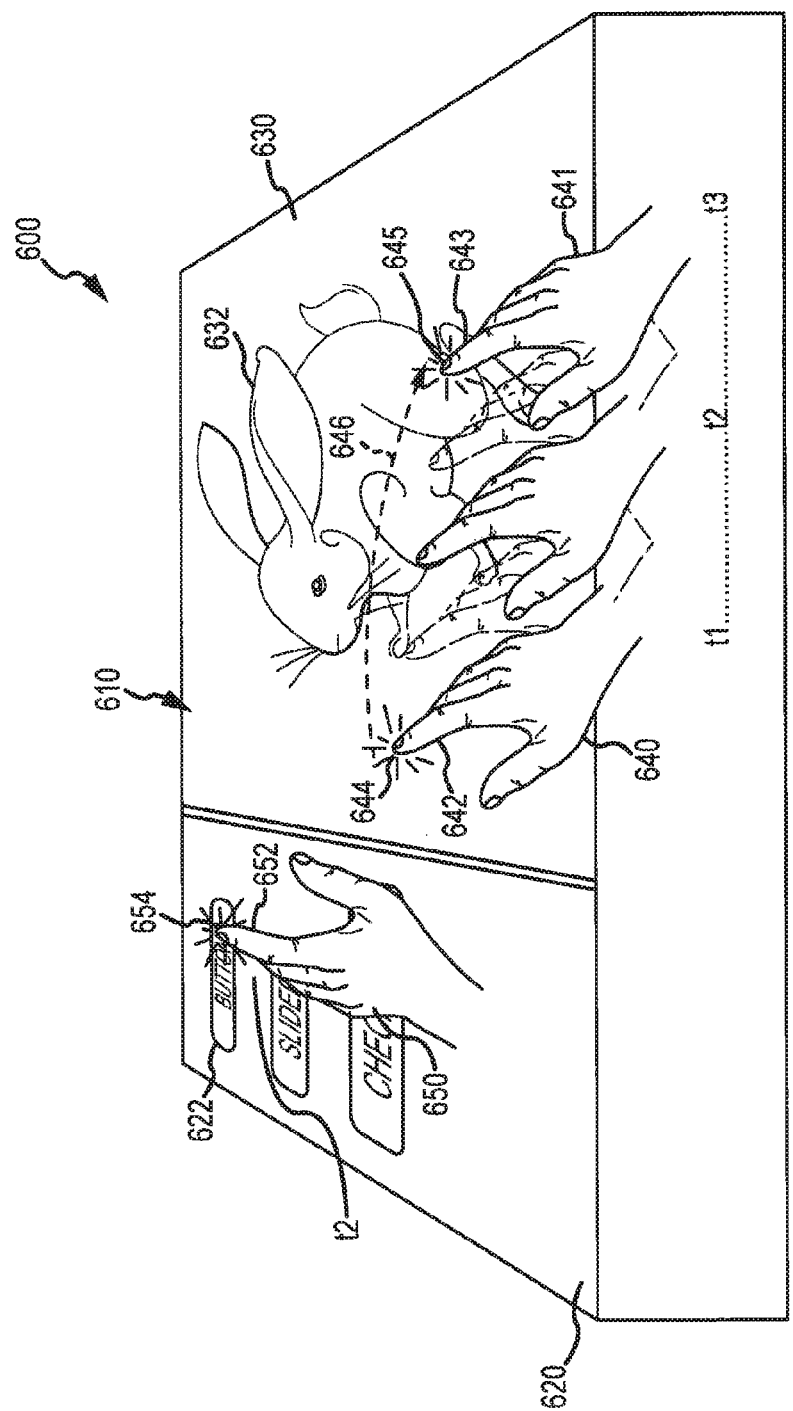
FIG. 6 illustrates a multi-touch device using a user input or touch processing module described herein such that a touch or user input to a non-MT aware area or region is allowed or processed even when occurring after a prior, concurrent (or simultaneous) touch or user input in a MT aware area or input region (e.g., the user input or "touch" in a MT aware region of the multi-touch surface is sent to the application as a touch event and a touch-to-mouse converter or adapter is kept as available for a later user input or "touch" in a non-MT aware region of the multi-touch surface).

FIG. 6 illustrates a multi-touch system or device (such as a surface computing table or the like) 600 that may be adapted as shown in systems 100 and 200 to handle touches as described in the method 300 of FIG. 3 and elsewhere herein. The multi-touch system 600 includes an MT input device or surface 610 that is adapted to sense touches by users of the system 600 to allow the user to provide input using their hands (as shown) or other "touch" input devices. The input device or surface 610 may provide a touch location and ID or other contact information to a multi-touch driver (or UI component of an application) of system 600. As with the system 500, one or more applications run by system 600 act to create a GUI on surface 610 with a MT aware region or portion 630, which corresponds to a touch aware UI component, and with a non-MT aware region 620, which corresponds to a non-MT aware UI component (e.g., a UI component that only recognizes keyboard, mouse, and similar inputs or events).

However, in contrast, a touch in system 600 may be handled as or translated into a mouse event even when it is not a first touch. In other words, the system 600 is adapted such that a first touch in the non-MT aware region 620 of the GUI of surface 610 is translated into a mouse event while touches in the MT aware region 630 of GUI of surface 610 are handled or processed as touch events (e.g., touch to mouse conversion remains available no matter how many touches occur in region 630). In operation of system 600, for example, a user 640 may use their finger (or other device) 642 to provide a touch at location or point 644 at a first time, $t_1$ (such as to select an object to be added to displayed object 632). The user may maintain this touch from the first time, $t_1$, to a second time, $t_2$, and on to a third time, $t_3$, as shown at 641 with finger 643 providing a touch at location or point 645. This may occur when a user selects an object in region 630 and drags 646 it to a new location/position as is common in many GUI applications. Updates in region 630 will be passed as touches during the drag 646. Similarly, additional touches may be made in region 630 by the same or other users, and each of these additional touches would be translated into touch events.

Without the described touch handling processes, the system 600 would not be able to handle touches in non-MT aware region 620 from the first time, $t_1$, to the third time, $t_3$. However, in the system 600, a user 650 may use their finger or other input device 652 to provide a user input or touch at a location or point 654 in the non-MT aware region at a time that is simultaneous with or after the first time, $t_1$, and the touch will still be properly handled or processed as a mouse event. In the illustrated example, a user 650 uses a finger 652 to provide a touch at location or point 654 in non-MT aware region 620, which coincides with an object 622. The touch at location 654 occurs at the second time, $t_2$ (i.e., while the drag 646 is occurring in the MT-aware region 630 of the GUI on surface 610).

The system 600 (e.g., a MT driver configured as described herein) determines that the UI component associated with the region or area 620 of the GUI does not accept touches but does accept mouse events and also determines that the touch-to-mouse conversion is available, as it has not been used or marked unavailable by the touches in the MT-aware region or area 630. As a result, the touch or click at location 654 on the button 622 at the second time, $t_2$, which is after a first touch in the MT-aware region or area 630, succeeds, and the user 650 is able to interact with the legacy UI component associated with the non-MT aware region or area 620 concurrently with interact with the MT-aware region or area 630.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed. As will be understood from the above description, the described processes and systems enable multi-handed interaction for a system with a control panel that includes legacy components and a canvas that may consume touch events. For example, this enables a system where the user may work on the canvas and activate action modifiers by pressing virtual buttons on the input surface (such as area 620 of FIG. 6). The user is not limited to simple "buttons" but may use any legacy control, such as but not limited to sliders, color pickers, and the like. The user may use such legacy controls without having to remove their hand from the canvas area of the system or its multi-touch display.

I claim:

1. A method comprising:
   with a multi-touch driver of a multi-touch input device, receiving touch data associated with a touch;
   determining a target user interface component for the touch by processing the touch data with the multi-touch driver;
   with the multi-touch driver, determining that the target user interface component does not accept touch events;
   in response to the determining that the target user interface component does not accept touch events, determining that the target user interface component accepts mouse events and that a touch-to-mouse conversion module is available for use; and
   marking the touch-to-mouse conversion module as unavailable in response to the determining that the target user interface component accepts mouse events and that the touch-to-mouse conversion module is available for use.

2. The method of claim 1, wherein the touch data is first touch data, and the touch is a, first touch received in an input region of the mufti-touch device associated with the target user interface component.

3. The method of claim 2, further comprising:
   receiving second touch data associated with a second touch that is input after the receiving of the first touch and while the first touch is maintained;
   determining a further target user interface component for the second touch by processing the second touch data with the multi-touch driver; and
   passing the second touch data to the further target user interface component associated with the second touch for processing as a mouse event.

4. The method of claim 1, further comprising sending the touch data to the target user interface component for processing as a mouse event.

5. The method of claim 4, wherein the touch data is received after the multi-touch driver has processed an earlier touch for the multi-touch device for an input region associated with another target user interface component that is adapted for accepting touch events, the earlier touch being maintained by the multi-touch driver when the touch data is received.

6. A non-transitory machine-readable storage medium comprising instructions that, when executed by one or more processors of a machine, cause the machine to perform operations comprising:
   receiving touch data associated with a touch;
   determining a target user interface component for the touch by processing the touch data with a multi-touch driver of a multi-touch device;
   determining that the target user interface component does not accept touch events;
   in response to the determining that the target user interface component Does not accept touch events, determining that the target user interface component accepts mouse events and that a touch-to-mouse conversion module is available for use; and
   marking the touch-to-mouse conversion module as unavailable in response to the determining that the target user interface component accepts mouse events and that the touch-to-mouse conversion module is available for use.

7. The non-transitory machine-readable storage medium of claim 6, wherein the touch is a first touch received in an input region of the multi-touch device associated with the target user interface component.

8. The non-transitory machine-readable storage medium of claim 7, wherein the operations further comprise:
   receiving data associated with a second touch that is input after the receiving of the first touch and while the first touch is maintained;
   determining a further target user interface component for the second touch by processing the second touch data with the multi-touch driver; and
   passing the second touch data to the further target user interface component is associated with the second touch for processing as a mouse event.

9. The non-transitory machine-readable storage medium of claim 6, wherein the operations further comprise sending the touch data to the target user interface component for processing as a mouse event.

10. The non-transitory machine readable storage medium of claim 9, wherein the touch data is received after the multi-touch driver has processed an earlier touch for the multi-touch device for input region associated with another target user interface component that is adapted for accepting touch events, the earlier touch being maintained by the multi-touch, driver when the touch data is received.

11. A multi-touch system comprising:
   a touch input device including a displayed graphical user interface with a first input region and a second input region;
   a computing device coupled to the touch input device, wherein the computing device is operable to run a first user interface component associated with the first input region and to run a second user interface component associated with the second input region, the first user interface component adapted to accept touch events and the second user interface component adapted to accept mouse events; and
   a multi-touch driver that configures a processor of the computing device to:
      receive touch data associated with a touch;
      determine a target user interface component for the touch by processing the touch data with a multi-touch driver of a multi-touch device;
      determine that the target user interface component does not accept touch events;
      in response to the determining that the target user interface component does not accept touch events, determine that the target user interface component accepts mouse events and that a touch-to-mouse conversion module is available for use; and
      mark the touch-to-mouse conversion module as unavailable in response to the determining that the target user interface component accepts mouse events and that the touch-to-mouse conversion module is available for use.

12. The system of claim 11, wherein the touch data is first touch data, and the touch is a first touch received in the first input region.

13. The system of claim 12, wherein the multi-touch driver configures the processor of the computing device to:
   receive second touch data associated with a second touch that is input after the receiving of the first touch and while the first touch is maintained;
   determine a further target user interface component for the second touch by processing the second touch data with the multi-touch driver; and
   pass the second touch data to the further target user interface component associated with the second touch for processing as a mouse event.

14. The system of claim 11, wherein the multi-touch driver configures the processor of the computing device to send the touch data to the target user interface component for processing as a mouse event.

* * * * *